United States Patent [19]

Jennings et al.

[11] E Patent Number: Re. 32,731

[45] Reissued Date of Patent: Aug. 16, 1988

[54] SILK SCREEN PRINTING ONTO THE FRONT PANEL OF A CAP

[75] Inventors: Roger L. Jennings; Russell A. Serrianne, both of Glens Falls, N.Y.

[73] Assignee: R. Jennings Manufacturing Co., Inc., Glens Falls, N.Y.

[21] Appl. No.: 638,370

[22] Filed: Aug. 7, 1984

Related U.S. Patent Documents

Reissue of:

[64] Patent No.: 4,438,693
Issued: Mar. 27, 1984
Appl. No.: 441,672
Filed: Nov. 15, 1982

[51] Int. Cl.[4] ..... B41M 1/12; B41F 17/00

[52] U.S. Cl. ..... 101/35; 101/126; 101/129

[58] Field of Search ..... 101/35, 38 R, 38 A, 101/126, 129; 400/128

[56] References Cited

U.S. PATENT DOCUMENTS

| | | | |
|---|---|---|---|
| 1,128,225 | 2/1915 | Choate | 400/128 X |
| 1,252,043 | 1/1918 | Shourt | 101/38 A |
| 1,477,282 | 12/1923 | Reynolds | 101/41 |
| 1,537,191 | 5/1925 | Reynolds | 101/41 |
| 1,600,077 | 9/1926 | Swanzey | 101/38 R X |
| 1,727,416 | 9/1929 | Smith | 400/128 X |
| 1,856,921 | 12/1929 | Lowenthal et al. | 223/24 |
| 2,340,979 | 2/1944 | Ostolaza et al. | 101/38 R X |
| 2,900,751 | 8/1959 | Mintz | 101/27 |
| 2,963,964 | 12/1960 | Klump | 101/123 |
| 3,036,698 | 8/1960 | Gronemeyer | 223/24 |
| 3,244,093 | 4/1966 | Vasilantone | 101/126 |
| 4,266,476 | 5/1981 | Maloof | 101/35 |

OTHER PUBLICATIONS

Atlas Cap Printing Attachment; Publication entitled "E-Z-R Accessories"; Exhibit No. 44, Case No. 84-63-6-Cir-T-13, U.S. District Court for the Middle District of Florida, Tampa Division.

*Primary Examiner*—Clifford D. Crowder
*Attorney, Agent, or Firm*—Nixon & Vanderhye

[57] ABSTRACT

A silk screen cap printing device has a saddle secured to a frame member for mounting a cap for printing. The saddle has a flat platen which supports the front panel of the cap and is further designed to provide interior supports to the cap thereby blocking it. This blocking prevents creases along the front panel and serves to maintain the cap in position during printing. A means for mounting the cap in the same position upon the saddle each time is provided by a registration plate which is secured to the frame in a spaced-apart perpendicular relationship to the platen and defines a channel between the platen and the plates for receiving the sweatband of the cap. Also connected to the frame is a silk screen which is adapted to move between an advanced position wherein the silk screen contacts the front panel of the cap which is mounted upon the saddle and a retracted position wherein the silk screen is withdrawn for changing caps.

13 Claims, 1 Drawing Sheet

FIG. 1
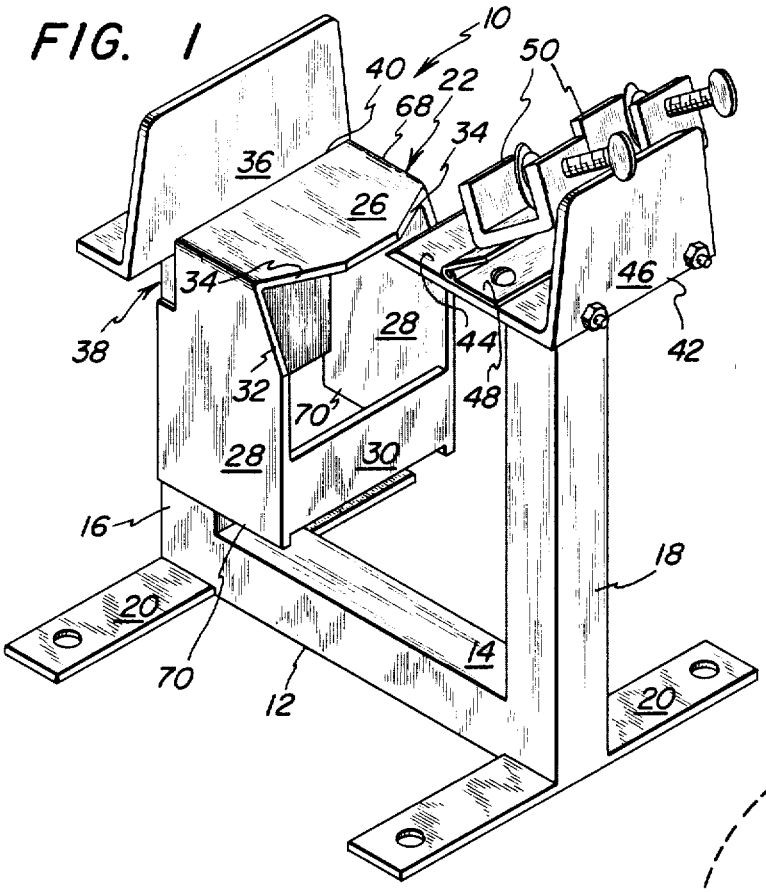
FIG. 5
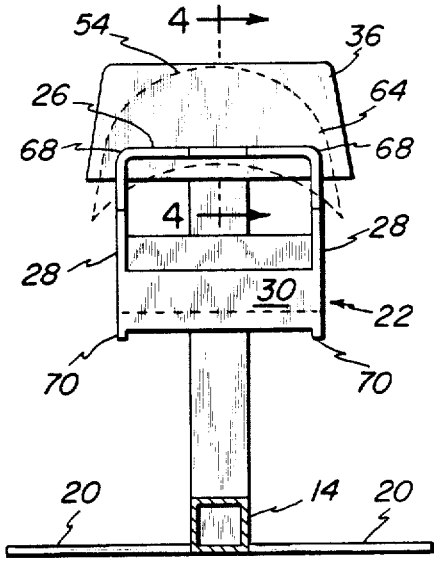
FIG. 4
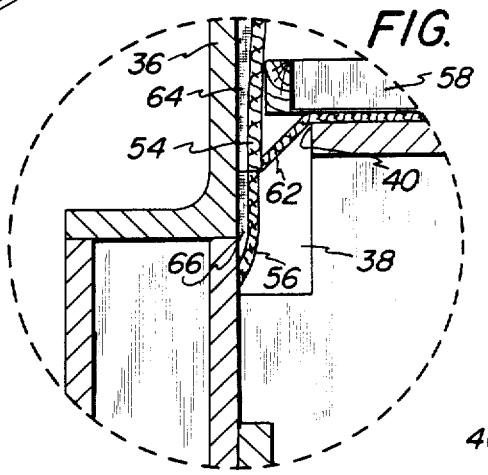
FIG. 2
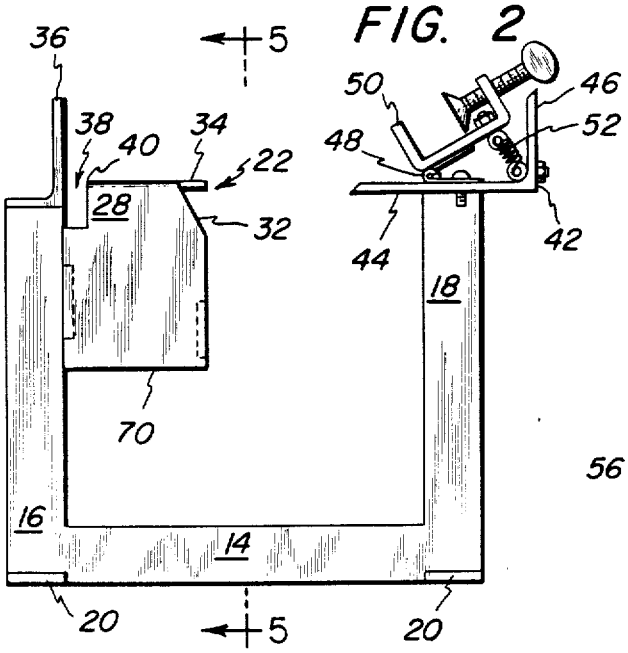
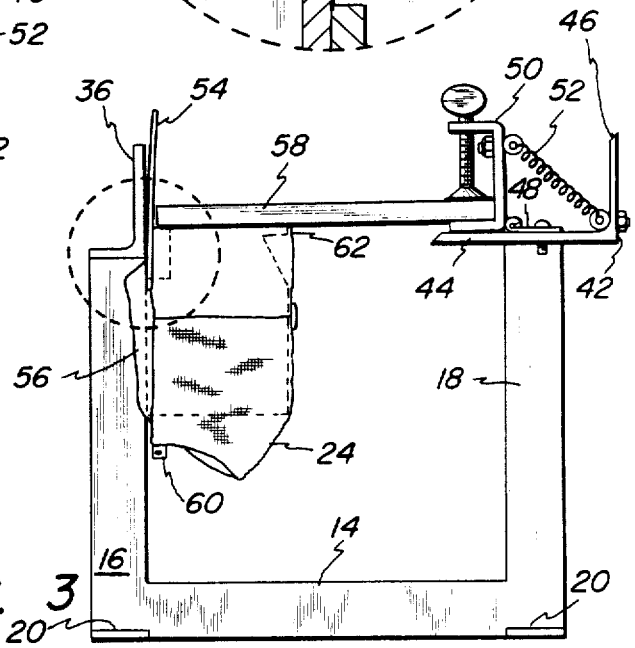
FIG. 3

SILK SCREEN PRINTING ONTO THE FRONT PANEL OF A CAP

Matter enclosed in heavy brackets [ ] appears in the original patent but forms no part of this reissue specification; matter printed in italics indicates the additions made by reissue.

FIELD OF THE INVENTION

This invention relates to cap printers which use a silk screen for transferring a design to the front panel of a cap.

BACKGROUND AND SUMMARY OF THE INVENTION

Logos and various designs have been applied to the front panel of caps for many years. The original way of applying these logos or designs was by making a patch and then sewing the patch to the front of the cap. This process, however, proved to be quite time consuming and expensive and has been substantially replaced by two methods presently in use.

One of these methods involves a heat transfer process. With this process, the printer generally orders appliques which are manufactured with the chosen design. In a few instances, a printer may have sufficient machinery himself to produce the appliques but this is generally not the case. Once the printer receives the appliques, he heat-seals them to the front panel of the caps. Drawbacks of this process include the time and cost required to have the appliques produced, usually by another company, and the fact that after a certain period of time, the appliques crack and peel. In addition, when smaller follow-up orders are received by the printer, it is generally not worth the cost of re-ordering extra appliques to fill these orders. For these reasons, a number of printers have begun using the process commonly known as silk-screen printing.

With silk-screen printing the printer first stretches the silk-screen or man-made mono-filament over a frame. To assure that there is no distortion when printing, the tension must be the same on all parts of the screen. A photograph is then taken of the chosen design and the image from the photograph is transferred onto the silk screen by a process well known in the art. After the image has been transferred onto the screen, an ink is spread over the entire screen. When the ink dries, it seals the silk screen except in those areas now containing the image. In order to print the design, one simply applies the screen to the material being printed on and with a squeegee runs some ink over the back of the screen. The ink travels through those portions of the screen which have not been sealed thereby transferring the design to the material. When the printing is completed, the frame is removed and stored in case of future orders. Thus, most printers have a large inventory of mounted silk screens which can be reused for filling follow-up orders.

Several of the advantages of silk screen printing include the speed with which a silk screen can be prepared generally by the printer himself, and the fact that the screen is always available for follow-up orders. Also, by using silk screens, printers have successfully avoided the difficulties of having the design crack or peel. For these reasons, the use of silk screen printing has been widely accepted. However, when applied to the printing of caps, a number of difficulties have been encountered which have prevented cap printers from taking full advantage of the silk screen process. Some of the difficulties unique to cap printing include trying to print onto a normally rounded surface and mounting all the caps in the same position so that the caps and the silk screen are properly aligned thereby avoiding crooked or off-centered impressions. This alignment is commonly referred to as registration.

When one prints onto the rounded front panel of a cap using a flat silk screen, a distorted impression is obtained. This is due to the fact that the pressure between the screen and the material being printed upon will vary with more pressure being applied at the top of the curve of the cap. This variation causes differences in the spreading of the ink as it passes through the silk screen and thereby causes distortion of the design applied to the cap.

In an attempt to overcome this shortcoming, two approaches have been used. The first uses a curved silk screen which matches the curvature of the cap being printed upon. The second approach uses a flat platen and attempts to flatten the curved front panel of the cap. Neither of these approaches have been successfully implemented and therefore, there was still a need for an accurate and clear printing silk screen cap printer. It was in light of this situation that we first began developing our invention.

During the initial steps of development, experiments were done with curved silk screens. However, use of a curved silk screen proved to be both impractical and expensive. The first difficulty of working with a curved frame involved the stretching of the silk screen over the frame. Due to the curvature, it was more difficult to obtain an equal tension throughout the screen. A variance in this tension would lead to a distorted image when the printed ink was passed through the screen.

The curved frames were also found to be significantly more expensive than the flat ones which are used by most printers. Due to the higher cost of the curved frame, it was impractical to store the silk screens in their mounted positions and therefore the screens had to be removed from the frames. Once the screen was removed from the frame and the tension was released, the screen would return to its normal size. When the screens were reframed, it was necessary to stretch them to the same degree that they had been stretched initially. When the silk screen was not reframed with the same degree of tension, the image produced was distorted.

One other difficulty involved matching the curvature of the frame and its associated silk screen to the cap being printed upon. In those situations where the curvature of the screen did not match the curvature of the cap, distortions would occur similar to those described above when a flat screen was applied to a rounded surface. Due to the numerous difficulties in dealing with a curved silk screen, we turned our efforts to the development of a silk screen printer which utilized a flat printing surface.

In the area of silk screen printers which utilized flat platens, the prior art had been unable to sufficiently flatten the front panel of the cap and anchor the cap so that it would not move during printing. In order to flatten the normally curved front panel of the cap, a certain amount of tension needs to be applied to the cap especially across the front panel. Those inventions which failed to provide for such tension found that the cap would move when the silk screen was applied and the front panel would often wrinkle. Those devices which did apply tension to the front panel of the cap did not apply the tension evenly. This caused distortions for two reasons. First, when the cap was removed from the printer, the stretched portions would return to their normal size. Those areas which were under greater tension would contract to a greater degree thereby producing unacceptable distortions in the design. Secondly, the variation in tension often caused creases along the front panel which prevented even printing. In addition, when mounting the caps on the prior devices it could not be determined whether or not the caps were being mounted in the same position each time. Therefore, the design was not transferred onto the same portion of the front panel of each cap.

Being familiar with the shortcomings of these cap printers, there were several features which we realized would be necessary to produce a successful silk screen cap printer. First, when the cap was mounted upon the printer, the tension across the front panel would have to be fairly equal at all points. Second, the screen and the cap would have to align in the same way for each printing. Third, the normally curved surface of the cap would have to be converted to a flat surface suitable for printing. Fourth, the cap would need to be mounted onto the printer in such a way that it would not move during printing.

When developing the present invention we sought to provide a printer capable of blocking a cap during printing. For the purposes of this application, "blocking" refers to the providing of interior supports at specific areas within the cap to avoid the creasing which would interfere with the flatness of the front panel of the cap being printed upon. This blocking also serves to maintain the cap in proper alignment during printing.

Thus, it was a primary object of this invention to provide a cap printer which would maintain the front panel of the cap flat so that there would be parallel printing surfaces.

Another object of this invention was to develop a printer wherein each cap when mounted would have the same aligned relationship with the silk screen.

Another object was to provide a printer wherein any tension applied to the printing surface would be applied evenly across the entire surface.

A still further object of this invention was to develop a printer which would secure the cap and thereby avoid movement during printing.

In general, this invention was developed to provide a printer wherein the design being transferred would not be distorted and wherein the design would also be centered in the same position on each cap.

Briefly described, the present invention has a saddle upon which the cap is mounted. The saddle has a flat platen over which the front panel of the cap is placed. A registration plate is mounted in a spaced-apart perpendicular relationship to the platen so as to define a channel between them into which the sweatband of the cap can be inserted. This relationship provides for the same registration of each cap since the registration plate serves to center the cap upon the saddle thereby assuring that the design is applied to the same part of the cap each time a cap is printed. In order to prevent the cap from creasing along the front panel, and to secure the cap during printing, the saddle is designed to support various portions of the interior of the cap thereby blocking the cap. A silk screen and frame attached to the printing device moves between an advanced and a retracted position such that the advanced position puts the screen in parallel contact with the front panel of the cap and the retracted position provides sufficient room for the cap to be removed from the saddle.

Also briefly described, the present invention includes a method for silk screen printing which involves mounting the cap on the saddle so that the cap is blocked. The cap is positioned so that the bill presses against the registration plate which is positioned in a spaced-apart perpendicular relationship to the flat platen. When the cap is pulled from the rear, the front panel is stretched across the platen thereby flattening it during the application of the silk screen. When applying this process, the sweatband of the cap resides in the space between the platen and the registration platen.

BRIEF DESCRIPTION OF THE DRAWINGS

FIG. 1 is a rear perspective view of the invention.

FIG. 2 is a side elevational view of the invention.

FIG. 3 is a side elevational view of the invention showing a cap mounted upon the saddle and a silk screen applied for printing.

FIG. 4 is an enlargement of several of the interacting components of FIG. 3.

FIG. 5 is a rear end view taken along lines 5—5 of FIG. 2.

DETAILED DESCRIPTION OF THE DRAWINGS

FIG. 1 discloses the silk screened cap printer generally designated as 10. The cap printer has a frame 12 which is U-shaped. The frame 12 consists of a crossbar 14 which would correspond to the base of the U, a first vertical extension 16 and a second vertical extension 18. A pair of legs 20 extend outwardly from the crossbar 14 and are perpendicular to the vertical extensions, for supporting the frame. For the purposes of this description the first vertical extension is considered to be the front of the printer and the second vertical extension is considered to be the rear of the printer.

Mounted upon the first vertical extension 16 and extending toward the second vertical extension 18 is a saddle 22 for mounting a cap 24, as shown in FIG. 3. The saddle 22 is shaped similar to a modified inverted "U" having a flat platen 26 as the base of the "U" and two side panels 28 extending downwardly therefrom. Side panels 28 terminate in bottom cap support edges 70. A retention bar 30 connects a portion of the rear edge of one side panel to the rear edge of the other side panel.

The rear corners of the saddle where the side panels and the flat platen 26 meet are beveled. The beveled edges 32 and 34 give this portion of the saddle a supporting shape generally similar to the shape of the crown of a cap so that when a cap is placed over the saddle and pulled taut, the tension is fairly evenly distributed and creases will not be formed across the intended printing surface of the cap, the front panel.

Attached to the top of the first vertical extension 16 is a registration plate 36. The base of the registration plate 36 is slightly below the platen 26. The registration plate is substantially perpendicular to the platen 26 and rises above said platen. The registration plate 36 and the platen 26 are secured in a spaced-apart relationship to each other such that a channel 38 exists between the plate and the front edge 40 of the platen 26.

Mounted atop the second vertical extension 18 is an L-shaped platform 42. The L-shaped platform 42 has a base portion 44 which is attached to the second vertical extension 18 and an upright 46 extending perpendicularly upward from the base 44 and attached to the rearmost portion of the base. Mounted upon the base 44 of the platform 42 is a hinge 48 and mounted to the hinge are two clamps 50. The clamps move between an advanced position (see FIG. 3) and a retracted position (see FIG. 2). The base 44 extends forwardly of the hinge 48 so that when the clamps 50 move to the advanced position, they will contact the forward portion of the base 44 thereby preventing excess movement beyond the advanced position. In the advanced position, the clamps are substantially perpendicular to the base. Bolted to each clamp 50 is a spring 52. This spring is also bolted to the platform 42 and serves to bias the clamp to its retracted position.

As shown in FIGS. 3 and 4, a cap 24 is placed over the saddle and is moved forwardly until the bill 54 comes in contact with the registration plate 36. The front panel 62 of the cap rests upon the flat platen 26. In addition, the sweatband 56 is folded out so that it enters the channel 38. When the cap is mounted in this manner, a silk screen (not shown) placed within a silk screen frame 58 which is, in turn, secured in clamps 50 will move to its advanced position which corresponds to the advanced position of the clamps such that the silk screen presses upon the front panel of the cap.

Prior to applying the silk screen, the cap is pulled downwardly to create a tension across the front panel. To pull downwardly on the cap, one can grasp the adjustment band 60 at the back of the cap. When pulled downwardly in this manner, the portion of the bill which connects to the cap will lie below the flat platen as shown in FIG. 5.

FIG. 4 is an enlargement of the interrelationship between the registration plate 36, the flat platen 26 and the channel 38 when a cap is mounted for printing. As shown in FIG. 4, part of the front panel 62 of the cap 24 is drawn downwardly into the channel 38. Also positioned in the channel is the sweatband 56 and a portion of the bill 54. When in position, the portions of the bill and sweatband through which the cross section was taken are slightly rearward of the registration plate 36. Shown pressing against the registration plate 36 is the underside of the outward end 64 of the bill 54 (see FIG. 5). When the silk screen frame 58 is moved to its advanced position, the front part of the frame contacts the bill and pushes it slightly toward the registration plate 36. Since the bill 54 of most caps is not flat, but rather is somewhat raised in the middle where contacted by the frame 58, this creates a small but useful pressure between the frame 58 and the bill 54 and between the side edges 64 of the bill and registration plate 36. The pressures thus created help to secure and stabilize the cap during the printing step which follows. At this point, the silk screen frame is simultaneously pressing upon the front panel 62, thereby holding the front panel in place such that the adjustment band of the cap can be released. In that way, the hand previously holding the adjustment band is free to run an ink squeegee over the silk screen, thereby transferring the desired image to the cap.

The placement of the bill 54 against the registration plate 36 results in virtually the same registration for each cap placed upon the saddle. In addition, various portions of the saddle serve to block the cap so that there are no creases on the front panel 62, the tension across the front panel is fairly uniform and the cap does not move during printing. The portions of the saddle serving to block the cap for printing include the beveled edges 34 of platen 26 and the beveled edges 32 of side plates 28, as previously mentioned, as well as the front edge 40 and rounded side edges 68 of platen 26, sides 28, bottom support edges 70 of sides 28 and retention bar 30. All these structures cooperate to produce the desired smoothing and uniformity of tension across the front panel of the cap when it is made taut by pulling downwardly on adjustment band 60.

It is apparent that the above-described configuration of the saddle prevents creasing and allows for fairly uniform tension across the entire front panel of the cap. In addition, the cap is sufficiently secured to the saddle so as to prevent any movement during printing. Since the tension is reasonably uniform, the shrinkage across the front panel upon removal of the cap is also uniform and the image is not distorted.

While the above disclosure describes the preferred embodiment of the present invention, it will be understood that many variations could be made and the scope of this invention is intended to be limited only by the scope of the appended claims.

What is claimed:

1. A cap printing device for silk screen printing into the front panel of a cap of the type having a sweatband and a bill comprising:

a frame member;

a saddle secured to the frame member for mounting the cap for printing, said saddle having a flat platen which supports the front panel of the cap when the cap is so mounted;

a registration plate against which the bill of the cap presses when the cap is mounted on the saddle, said registration plate being secured to the frame in a spaced-apart perpendicular relationship with the platen, the space between the registration plate and the platen defining a channel for receiving the sweatband of the cap; and a means for movably securing a silk screen to the frame for movement between an advanced position wherein the silk screen contacts the front panel of a cap mounted on the saddle and a retracted position wherein the silk screen is withdrawn for changing caps.

2. The invention of claim 1 wherein the saddle includes means for blocking a cap mounted thereon.

3. The invention of claim 2 wherein the blocking means includes a pair of side forming members connected to the platen in an opposed relationship to one another for shaping the sides of a mounted cap.

4. The invention of claim 3 wherein the blocking means further includes a rear forming member for shaping the top of a cap.

5. The invention of claim 1 wherein the platen has four edges, a front edge closest to the registration plate, a rear edge furthest from said registration plate, and two side edges connecting the ends of the front edge to the ends of the rear edge, and wherein said saddle further comprises:

a bottom support over which the rear portion of the cap is fitted when the cap is mounted on the saddle for printing; and a retention bar aligned beneath the rear edge between the flat platen and the bottom support to prevent the top of the cap, which spans the space between the rear edge and the bottom support, from creasing inwardly.

6. The invention of claim 5 wherein the side edges are rounded.

7. The invention of claim 6 further comprising a pair of side panels each extending downwardly from one of the rounded edges to prevent creasing along the sides of the cap when it is mounted on the saddle.

8. The invention of claim 7 further comprising a means for biasing the silk screen to its retracted position.

9. A method of silk screen printing onto the front panel of a cap having a bill and a sweatband comprising the following steps:

mounting the cap on a saddle having a flat platen for supporting the front panel of the cap so that its sweatband overhangs the platen;

pressing the bill of the cap against a registration plate positioned in a spaced-apart perpendicular relationship with the platen;

positioning the sweatband in the space between the platen and the registration plate;

pulling the rear of the cap so as to stretch its front panel across the platen; and silk screen printing on the front panel of the cap.

10. The invention of claim 9 comprising the further step of blocking the mounted cap before printing.

*11. A cap printing device for screen printing onto front panel of a cap of the type having a sweatband and a bill comprising:*

*a frame member;*

*a substantially flat platen operatively attached to the frame member for mounting the front panel of a cap when the cap is mounted thereon;*

*means for blocking a cap mounted on said platen, said blocking means including a pair of side forming surfaces operatively connected to the platen in an opposed relationship to one another for shaping the sides of a mounted cap so that tension is applied evenly across the platen; the blocking means further comprising a rear forming member for shaping the top of a cap, and said rear forming member comprising an edge of said platen forming a non-linear edge surface for engaging a cap; and wherein said platen comprises a linear edge opposite said non-linear edge, said linear and non-linear edges being disposed between said side forming members of said platen; and*

*means for movably securing the screen in operative association with said frame for movement between an advanced position wherein the screen contacts the front panel of the cap mounted on the platen and a retracted position wherein the screen is withdrawn for changing caps.*

*12. A cap printing device for screen printing onto front panel of a cap of the type having a sweatband and a bill comprising:*

*a frame member;*

*a substantially flat platen operatively attached to the frame member for mounting the cap for printing, said flat platen supporting the front panel of a cap when the cap is mounted thereon; and*

*blocking means for blocking a cap mounted on the platen, said blocking means comprising a rear forming member for shaping the top of a cap mounted on the platen so that tension is applied evenly across the platen, said rear forming member comprising an edge of said platen forming a non-linear surface for engaging a cap; and wherein said platen comprises a linear edge opposite said non-linear edge.*

*13. A cap printing device for screen printing onto the front panel of a cap of the type having a sweatband and a bill comprising:*

*a frame member;*

*a substantially flat platen operatively attached to the frame member for mounting the cap for printing, said flat platen supporting the front panel of a cap when the cap is mounted thereon; and*

*said flat platen including a front substantially straight edge over which the sweatband of the cap is placed during printing, and a beveled second edge opposite said front edge, said beveled second edge having beveled portions comprising a supporting shape generally similar to the shape of the crown of the cap so that when the cap is placed over the platen and pulled taut, the tension is fairly evenly distributed and creases will not be formed across the front panel of the cap when a screen is moved into operative association with a cap on said platen.*

* * * * *